US007899433B2

(12) United States Patent
Lee et al.

(10) Patent No.: US 7,899,433 B2
(45) Date of Patent: Mar. 1, 2011

(54) METHOD AND APPARATUS FOR SAVING POWER BY CONTROLLING LISTENING PERIODS IN WIRELESS TELECOMMUNICATION DEVICE HAVING A PLURALITY FOR POWER-SAVING MODES

(75) Inventors: Jae-min Lee, Suwon-si (KR); Ho-seok Lee, Anyang-si (KR); Hyung-jick Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1195 days.

(21) Appl. No.: 11/507,470

(22) Filed: Aug. 22, 2006

(65) Prior Publication Data
US 2007/0072578 A1 Mar. 29, 2007

(30) Foreign Application Priority Data
Sep. 26, 2005 (KR) ...................... 10-2005-0089524

(51) Int. Cl.
*H04B 1/16* (2006.01)
(52) U.S. Cl. .................................... 455/343.1; 455/574
(58) Field of Classification Search ............ 455/343.1, 455/574
See application file for complete search history.

(56) References Cited
U.S. PATENT DOCUMENTS

| 5,940,431 | A | * | 8/1999 | Haartsen et al. ............. 375/131 |
| 6,278,703 | B1 | * | 8/2001 | Neufeld ...................... 370/342 |
| 6,389,057 | B1 | * | 5/2002 | Haartsen ..................... 375/132 |
| 6,462,437 | B1 | * | 10/2002 | Marmaropoulos et al. .. 307/125 |
| 6,968,219 | B2 | * | 11/2005 | Pattabiraman et al. ...... 455/574 |
| 7,535,881 | B2 | * | 5/2009 | Maekawa et al. ........... 370/338 |
| 2005/0003794 | A1 | * | 1/2005 | Liu ............................ 455/355 |
| 2005/0018624 | A1 | | 1/2005 | Meier et al. |
| 2005/0018625 | A1 | * | 1/2005 | Sugitani et al. ............. 370/321 |
| 2005/0096033 | A1 | * | 5/2005 | Miyawaki et al. ........ 455/422.1 |
| 2007/0072578 | A1 | * | 3/2007 | Lee et al. ................. 455/343.1 |

FOREIGN PATENT DOCUMENTS
EP 1519599 A3 9/2005

OTHER PUBLICATIONS

Yu-Chee Tseng, et al., "Power-Saving Protocols for IEEE 802.11-Based Multi-Hop Ad Hoc Networks", catalog, 2002.
Vladimir Yanover, et al., "Sleep Mode Generic Mechanism", catalog, Nov. 2004, pp. 1-17, IEEE C802.16e-04/459r1.
Kunai, Rupani: "Algorithm and Method for Optimizing Sleep Mode Operation in 802.16e Network", IP.COM Journal, IP.COM Inc., West Henrietta, NY, US, Mar. 28, 2006, ISSN: 1533-0001.
Xiao, Yang: "Energy Saving Mechanism in the IEEE 802.16e Wireless MAN", IEEE Communications Letters, IEEE Service Center, Piscataway, NJ, US, vol. 9, No. 7, ISSN: 1089-7798, May 2004.

* cited by examiner

*Primary Examiner*—Yuwen Pan
(74) *Attorney, Agent, or Firm*—Sughrue Mion, PLLC

(57) ABSTRACT

A method and apparatus for reducing power consumption by controlling listening periods in a wireless telecommunications device having a plurality of power-saving modes are provided. The method includes: setting a first power-saving mode and a second power-saving mode, each of the first and second power-saving modes having a power-saving mode period in which power is saved and data is not transmitted and received, and a standby period in which data is transmitted and received; detecting the standby mode periods from the first and second power-saving modes; adjusting starting periods of the first and second power-saving modes so that the detected standby mode periods of the first and second power-saving modes overlap; and controlling power according to the adjusted first and the second power-saving modes.

16 Claims, 6 Drawing Sheets

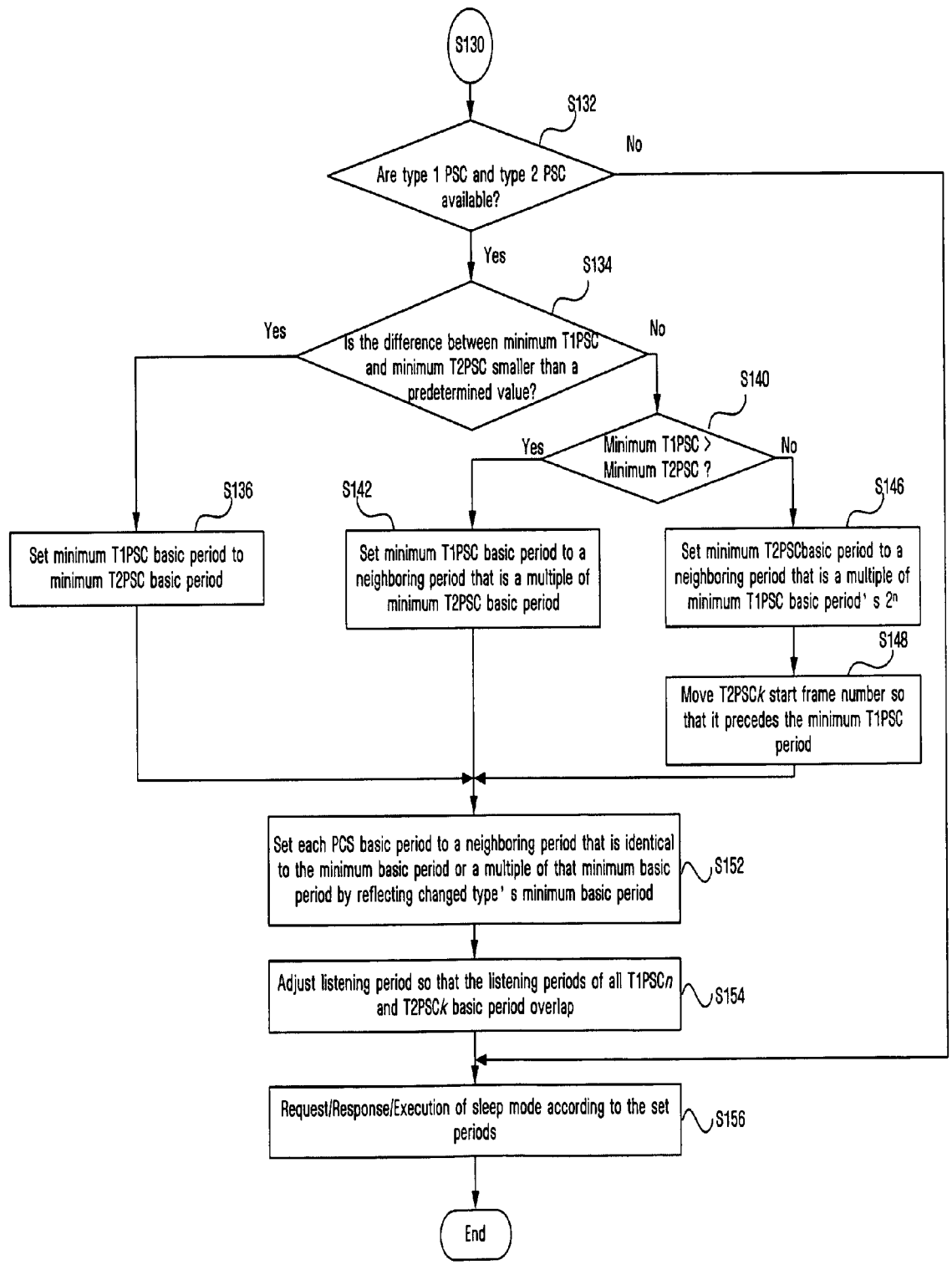

METHOD AND APPARATUS FOR SAVING POWER BY CONTROLLING LISTENING PERIODS IN WIRELESS TELECOMMUNICATION DEVICE HAVING A PLURALITY FOR POWER-SAVING MODES

CROSS-REFERENCE TO RELATED APPLICATIONS

This application claims priority from Korean Patent Application No. 10-2005-0089524 filed on Sep. 26, 2005, the disclosure of which is incorporated herein in its entirety by reference.

BACKGROUND OF THE INVENTION

1. Field of the Invention

Methods and apparatuses consistent with the present invention relate to saving power consumption by controlling listening periods in a wireless telecommunications device having a plurality of power-saving modes, and more particularly, to reducing power consumption by minimizing listening window periods when different powers saving classes are available in power-saving mode of a terminal device of a subscriber.

2. Description of the Related Art

In wireless telecommunications, power consumption of a terminal device is reduced by not constantly supplying power to the device.

When there is no traffic, an IEEE 802.16e wireless connection or telecommunications system using orthogonal frequency division multiple access (OFDMA) is put in sleep mode, i.e., power-saving mode, according to the IEEE 802.16e standard.

FIG. 1 illustrates mode switches according to traffic and power consumption according to the switches in a wireless telecommunications terminal device.

Different amounts of network traffic may exist in a broadband wireless connection system. A connection identifier (CID) corresponding to traffic may be allocated, and a power-saving class (PSC) is defined for each connection. In addition, a terminal device, while in sleep mode, wakes up regularly and receives information, from a base station, about whether there is traffic. Operations in sleep mode will now be described in detail.

First, a terminal device sends an MOB_SLP_REQ message to a base station to be put into sleep mode. Here, the terminal device sends desired PSC information, e.g., an initial sleeping window, a listening window, and a start frame number in units of a frame.

Second, the base station sends the terminal device an MOB_SLP_RSP message in response to the MOB_SLP_REQ message. Here, the terminal device sends the start time, i.e., the number of frames left until the terminal device is put in sleep mode, and PSC information approved in the base station.

Lastly, the terminal device put in sleep mode at a corresponding start frame number, wakes up after an initial sleeping window, and receives an MOB_TRF_IND message during a listening window period. If the MOB_TRF_IND message indicates no traffic, the terminal device stays in sleep mode, but if the MOB_TRF_IND indicates traffic, the sleep mode is terminated and the terminal device is put in normal mode.

Referring to FIG. 1, a packet is transmitted and received in normal mode 10, in which more power is consumed, while less power is consumed when the terminal device is in sleep mode 20. In listening mode 30, on the other hand, power consumption is as high as it is in normal mode 10 transceiving data. Hence, when the terminal device is frequently set in listening mode, more power is consumed. However, even if not frequently set in listening mode, efficiency is not high when data is transmitted and received.

FIG. 2 is a drawing illustrating sleep/listening periods of a terminal device having at least two power-saving modes when two power-saving modes are used. In the IEEE 802.16e standard, three types of PSCs are declared according to characteristics of different traffic. In a type 1 PSC, listening windows, related to the length of a listening mode, are constant in length, whereas sleeping windows, related to the length of a sleep mode, are multiplied by 2n. In a type 2 PSC, both the sleeping windows and the listening windows are constant in length. In a type 3 PSC, the sleep mode is on or off according to a constant trigger operation.

Therefore, the terminal device may have two or more PSCs corresponding to each CID. FIG. 2 illustrates use of power-saving modes by concurrently using PSCs defined as the type 1 PSC and the type 2 PSC in a terminal device. In the type 1 PSC, an initial sleeping window period is one frame and a listening window period is also one frame. The sleeping window period is 3 frames and the listening window is one frame in the type 2 PSC. The terminal device stays awake to perform normal transmitting and receiving operations during the listening window when two PSCs are used, receives an MOB_TRF_IND message from a base station, and indicates whether there is traffic to transmit to the corresponding terminal device during the sleeping window.

Sleep modes are used to minimize power consumption in a portable terminal device; however, when different PSCs are used, in a conventional method, it is likely that short sleeping window periods will be followed by a lot of listening window periods by an initial sleeping window, a listening window, and a start frame number. Hence, when there are two types of PSCs available in a single terminal device, it is essential to have a method of minimizing the listening window.

SUMMARY OF THE INVENTION

The present invention provides a method and apparatus for reducing listening periods in a terminal device having at least two power-saving modes.

The present invention also provides a method and apparatus which maintain quality in telecommunications while reducing the length of listening windows.

According to an aspect of the present invention, there is provided a method of saving power by controlling listening periods in a wireless telecommunications device having a plurality of power-saving modes, wherein the wireless telecommunications device has at least two kinds of power-saving modes, which includes a saving mode period in which power is saved and data is not transmitted and received, and an standby period in which data is transmitted and received, the method including setting a first and a second power-saving modes, detecting the standby mode period from the first and second power-saving modes, adjusting a start time or the length of starting periods of the first or second power-saving mode so that the detected standby mode periods of the first and second power-saving modes overlap, and controlling power according to the adjusted first and second power-saving modes.

According to another aspect of the present invention, there is provided a wireless telecommunications device, wherein the wireless telecommunications device has at least two kinds of power-saving modes, which includes a saving mode period in which power is reduced and data is not transmitted and received, and a standby mode period in which data is transmitted and received, the device including a power-saving mode interval scheduler that controls intervals between power-saving modes, a power-saving mode message transmitting and receiving controller that transmits and receives messages with respect to the power-saving mode, a parameter controller that sets a first and a second power-saving modes, detects the standby mode therefrom, and adjusts a start time or the length of starting periods of the first or second power-saving mode so that the standby modes in the detected the first power-saving mode and the second power-saving mode overlap, and a power-saving mode hardware controller that controls power consumption according to the changed first and second power-saving modes.

BRIEF DESCRIPTION OF THE DRAWINGS

The above and other aspects of the present invention will become apparent by describing in detail exemplary embodiments thereof with reference to the attached drawings in which:

FIG. 7 is a continuation of FIG. 6, and illustrates the post-initialization processes in order to execute a power-saving mode.

DETAILED DESCRIPTION OF EXEMPLARY EMBODIMENTS THE INVENTION

Figure 1:
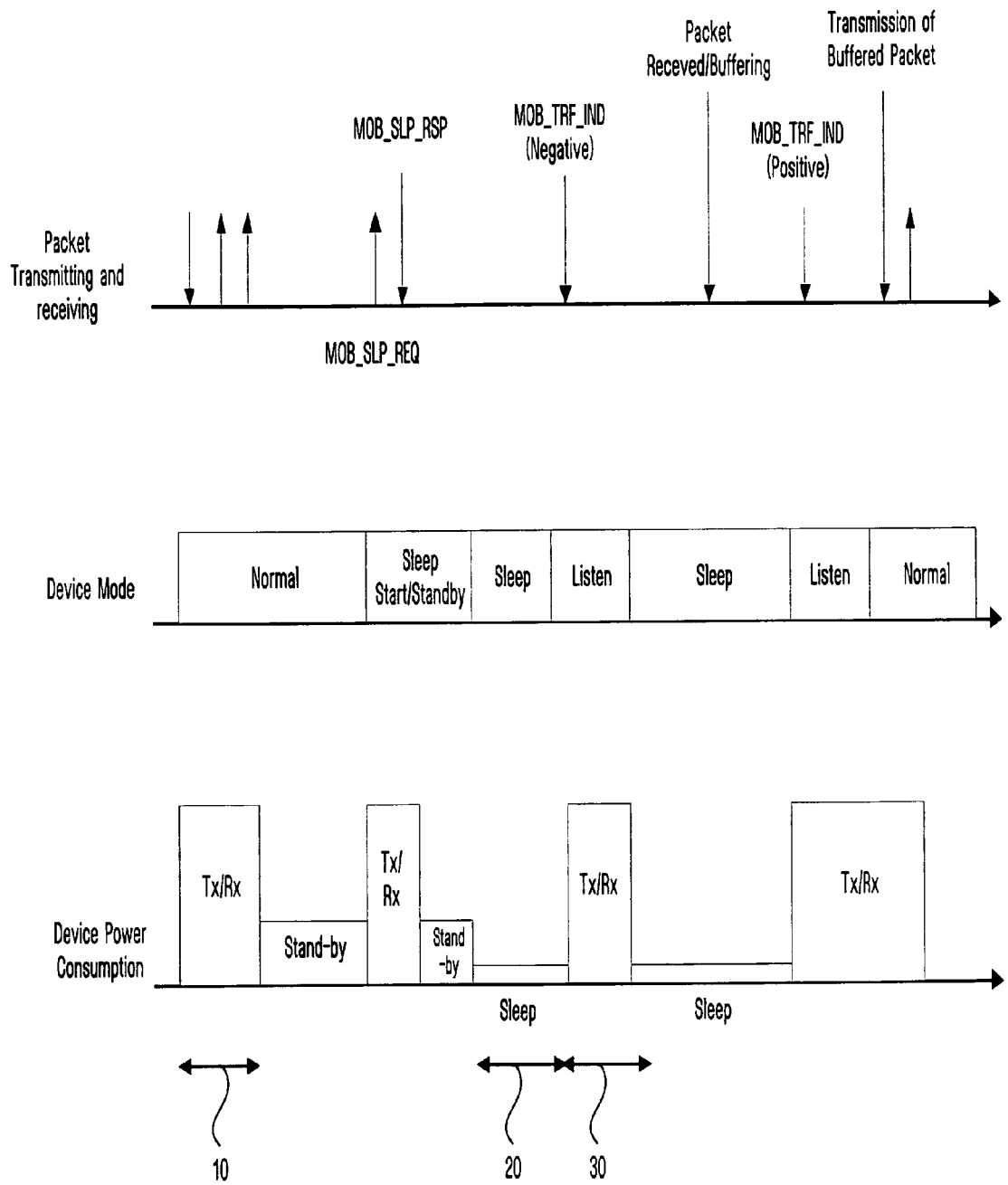
FIG. 1 illustrates switches in mode according to traffic and power consumption of a wireless telecommunication device.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It should be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

In the aforementioned related art, a problem exists in that a wireless terminal device with different types of PSCs applied is not effective in power-saving when there are listening windows frequently appearing in the device. Therefore, the present invention discloses a means for enhancing power-saving effects by having the listening windows of different types of PSCs overlap.

Figure 3:
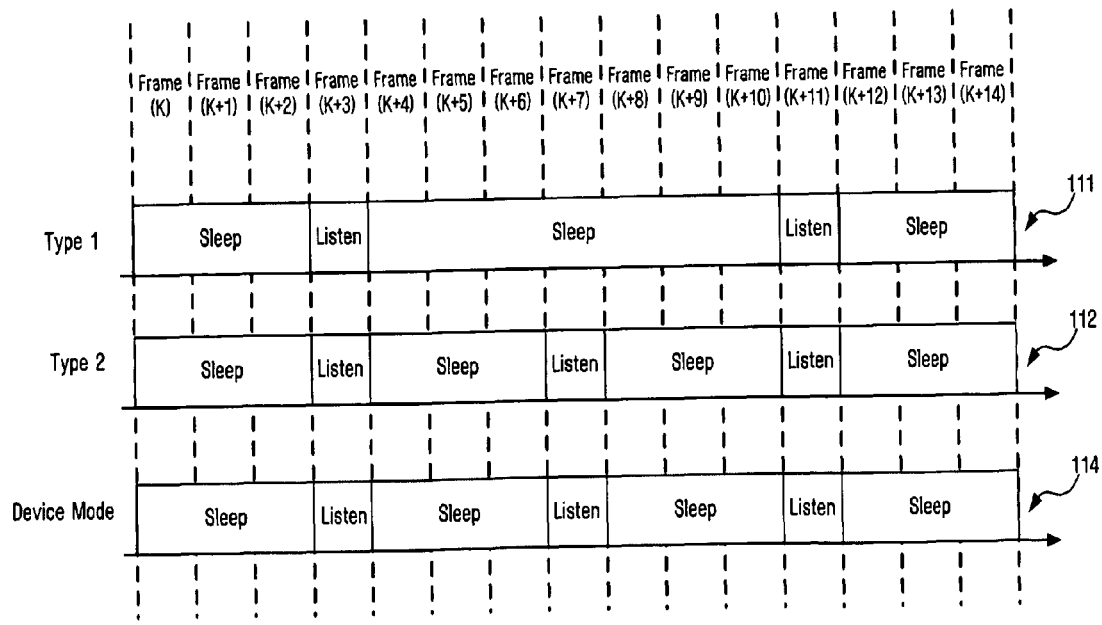
FIG. 3 illustrates that the size of a type 1 initial window is adjusted to fit in the type 2 initial window according to an exemplary embodiment.

FIG. 3 illustrates that the size of a type 1 initial window is adjusted to fit in a type 2 initial window according to an exemplary embodiment. The length of initial window is set to any value other than 1 so that a type 1 listening window period coincides with a type 2 listening window period.

Figure 2:
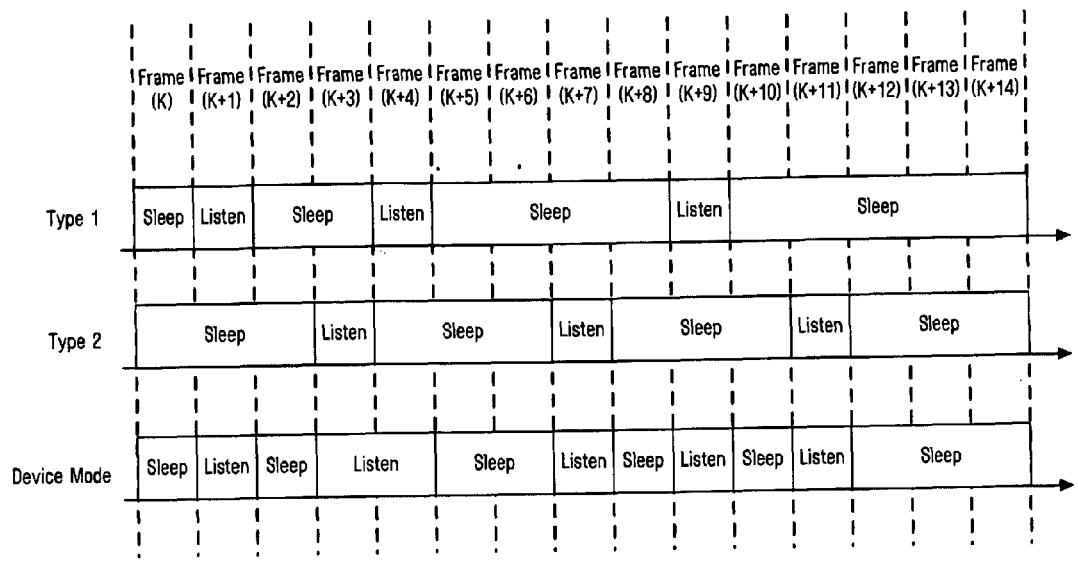
FIG. 2 is a drawing illustrating sleep/listening periods of a terminal device having at least two power-saving modes when two of the power-saving modes are used.

FIG. 2 illustrates that the length of the sleeping window is multiplied by $2^n$. Here, the listening window is positioned at $2^n+1$ frame, and is not likely to be a multiple of other specific numbers. In type 1, as illustrated in FIG. 3, the sum of the length of the sleeping window and the listening window is multiplied by a multiple of two. Accordingly, the length of the sleeping window becomes $2^n-1$ frames, while the length of the listening window is still 1 frame and the listening window is positioned at whatever frame that is a multiple of two as denoted by reference numeral 111 of FIG. 3. Type 1 listening windows are positioned at frames K+3 and K+11. Meanwhile, as denoted by reference numeral 112 of FIG. 3, since type 2 listening windows are positioned at frames K+3, K+7, and K+11, the length of the initial window is set to 4 so that the sum of the lengths of the sleep window and listening window is 4 frames. Consequently, the listening window periods in the terminal device are positioned at frames K+3, K+7, and K+11. Compared with FIG. 2, it is shown that the length of the listening windows is reduced from six to three.

Figure 4:
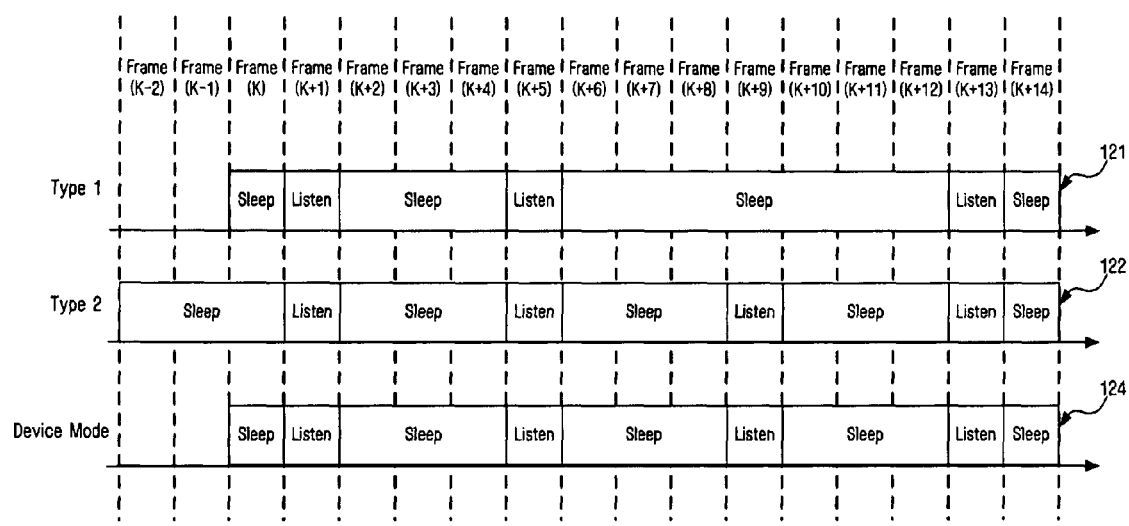
FIG. 4 illustrates that the start period of the type 2 initial window is adjusted to fit in the type 1 slip window period according to an exemplary embodiment.

FIG. 4 illustrates that the length of a starting period of type 2 is adjusted to fit in the sleeping window period of type 1 according to an exemplary embodiment. As in FIG. 3, the sum of the lengths of the type 1 sleeping window and the type 1 listening window is multiplied by $2^n$. In FIG. 3, an initial length, i.e., the sum of the lengths of the sleep window and the listening window is set to 4 frames but is set to 2 frames in FIG. 4 as denoted by reference numeral 121. Therefore, the length of the sleep window and listening window is set to 1 frame. In comparison with the type 1 initial sleep window, the type 2 initial window starts 2 frames faster so the type 2 listening window coincides with the type 1 listening window. Accordingly, the type 2 window begins at frame K−2, whereas the type 1 window begins at frame K.

Consequently, type 1 listening windows are positioned at frames K+1, K+5, and K+13, whereas type 2 listening windows are positioned at frame K+1, K+5, K+9 and K13. As denoted by reference numeral 124, the listening windows are positioned at K+1, K+5, K+9, and K+13 in terminal mode, thus, the type 2 listening windows and terminal mode listening windows overlap.

FIG. 4 illustrates that the terminal mode is adjusted according to the proposed method when there is a significant difference in the minimum basic periods of type 1 and type 2 windows.

Each component illustrated in FIG. 3 or FIG. 4, is, but is not limited to, a software or hardware component, such as a Field Programmable Gate Array (FPGA) or an Application Specific Integrated Circuit (ASIC), which performs certain tasks. A component may advantageously be configured to reside in an addressable storage medium and configured to be executed on one or more processors. The functionality provided for in the components may be combined into fewer components or further separated into additional components.

Figure 5:
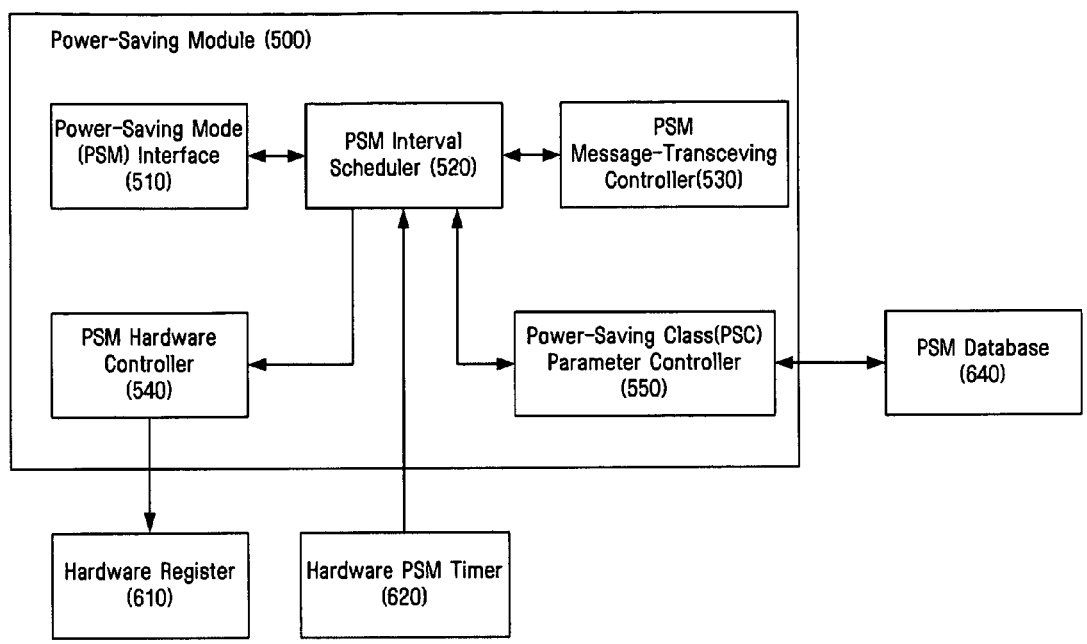
FIG. 5 illustrates a configuration of a power-saving module according to an exemplary embodiment.

FIG. 5 illustrates a configuration of a power-saving module according to the present embodiment. A power-saving module 500 inside a terminal device controls the power consumed therein. A power-saving mode (PSM) interface 510 goes into sleep mode in a portion, where the state of the terminal device is controlled, in order to save power, or transmits and receives calling data in order to switch from sleep mode to normal mode. Sleep windows and listening windows are scheduled at a PSM interval scheduler 520. A PSM message-transmitting and receiving controller 530, along with a base station, transmits and receives messages such as a MOB_SLP_REQ/RSP message, and a MOB_TRF_IND message that are required in order to set the power-saving mode.

A PSM hardware controller 540 controls the terminal device in such a way that the terminal device can save power in sleep mode. A hardware register 610 controls how much of the power delivered to the hardware is consumed. A PSC parameter controller 550 controls various parameters of the PSC.

A PSM database 640 stores several set values, i.e., information about type 1 configuration and type 2 configuration, in order to save power. A hardware PSM timer 620 provides accurate time intervals to the PSM interval scheduler 520, and controls the lengths of the sleeping window and the listening window according to scheduled information.

Referring to the PSC parameter controller 550, listening window periods of each type are configured to overlap when there are two or more PSCs available in a terminal device. Configurations include the aforementioned methods with respect to FIGS. 3 and 4, and may vary according to a method of saving power.

Figure 6:
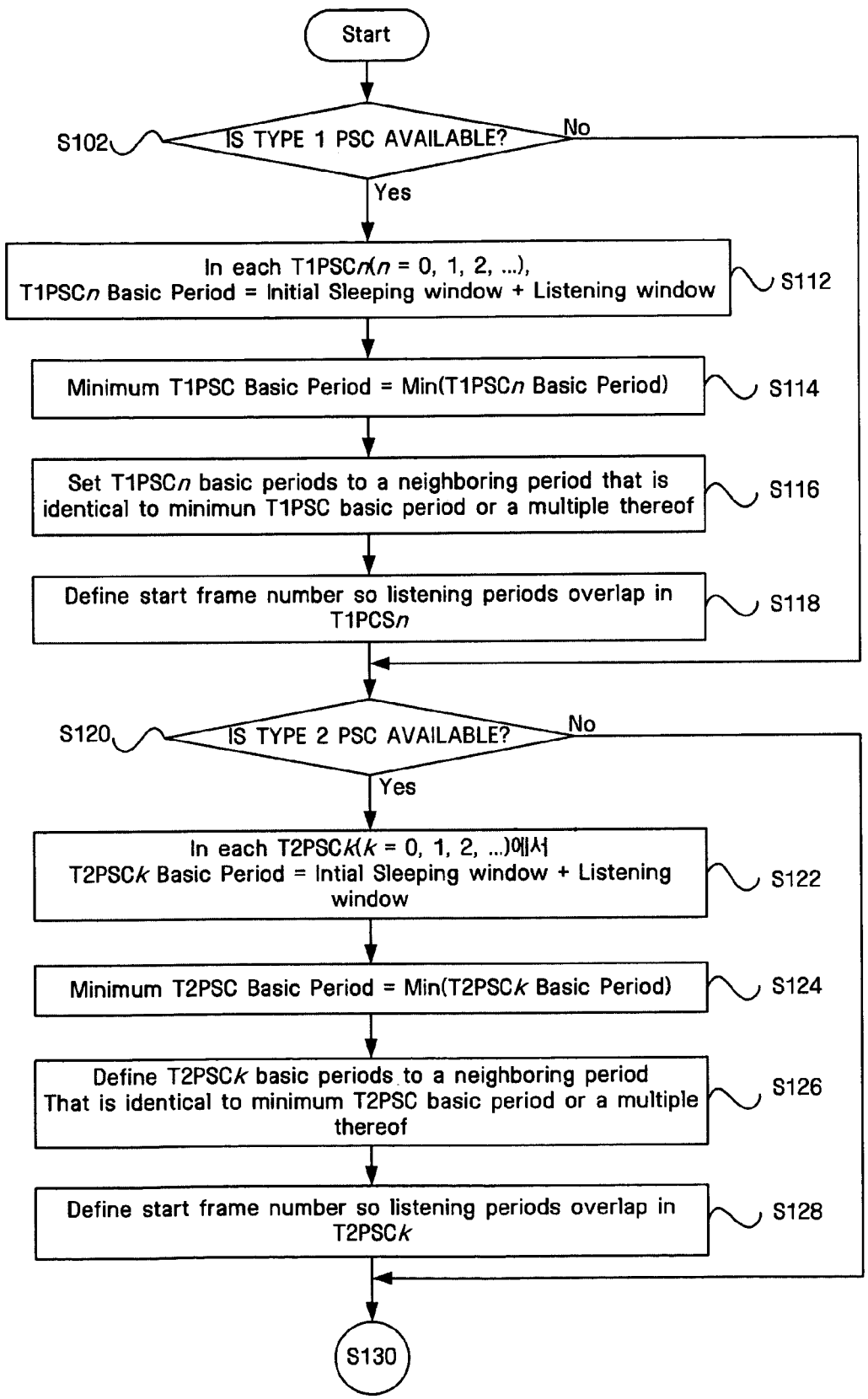
FIG. 6 is a flow chart illustrating some of the initialization processes in order to execute power-saving mode in a terminal device that has both type 1 and type 2 PSCs available.

FIG. 6 is a flow chart illustrating some of the initialization processes in order to execute power-saving mode in a terminal device that have both type 1 and type 2 PSCs available. First, before a sleep mode is initiated, information about PSCs stored in a PSM database is checked, and then set PSCs' types are checked. When it is determined that the type 1 PSC is available in operation S102, a T1PSCn basic period is defined by adding the lengths of an initial sleep window and an initial listening window in operation S112. The T1PSCn basic period with the smallest n value is defined as a minimum T1PSC basic period in operation S114. The values for periods are reset so each T1PSCn basic period is equal to the minimum T1PSC basic period or is a multiple thereof in operation S116. In addition, the listening period in the basic period is set and a start frame number is set according thereto in operation S118.

The same operations are carried out in a type 2 PSC. When it is determined that the type 2 PSC is available in operation S120, a T2PSCk basic period is defined by adding the lengths of an initial sleep window and an initial listening window in operation S122. The T2PSCk basic period with the smallest k value is defined as a minimum T2PSC basic period in operation S124. The values for periods are reset to the minimum T2PSC basic period or is a multiple thereof so each T2PSCk basic period is constant in operation S126. In addition, the listening period in the basic period is set and a start frame number is set accordingly in operation S128.

Once type 1 and type 2 PSCs have been set via operations S102 through S128, operations are carried out in order to set two or more types of listening periods, which is illustrated in FIG. 7.

FIG. 7 is a continuation of FIG. 6, and illustrates the post-initialization processes in order to execute power-saving mode.

In operation S132, it is checked whether the type 1 PSC and the type 2 PSC are available on a terminal device. If it is determined that the two types are unavailable, a request for sleep mode is made, a response thereto is made, and an execution is carried out according to the set periods without setting any periods in operation S156.

If it is determined that two types are available in operation S132, a minimum T1PSC basic period and a minimum T2PSC basic period are compared. When it is determined that a difference in value is smaller than a predetermined value in operation S134, the minimum T1PSC period is set to the minimum T2PSC period, which does not significantly effect T1PSC, in operation S136. The predetermined values may be 2 or 3 frames, and the aforementioned method with respect to FIG. 3 is an example thereof.

When it is determined the difference is greater than a predetermined value in step S134, setting the minimum T1PSC to the minimum T2PSC may have negative effects on a type 1 PSC. Accordingly, a starting period may be reset as opposed to resetting the lengths of the periods.

In step S140, if there is a significant difference between the minimum T1PSC period and the minimum T2PSC period, it is checked which period is longer. If it is determined that the minimum T1PSC period is longer than the minimum T2PSC period in operation S140, the minimum T1PSC basic period is set to a neighboring period that is a multiple of the minimum T2PSC basic period in operation S142 because T2PSC is based on the type 2 PSC in which T2PSC has a fixed length.

Conversely, if it is determined that the minimum T1PSC is shorter than the minimum T2PSC in operation S140, the minimum T2PSC basic period is set to a neighboring period that is a multiple of 2n of the minimum T1PSC basic period in operation S146 because T1PSC is based on the type 1 PSC in which T1PSC is multiplied by a number raised to an exponent. In operation S148, T2PSCk start frame is moved in order to be ahead of the minimum T1PSC period, which is illustrated in FIG. 4.

When T1PSC and T2PSC have been reset via operations S134 through S148, the changes are applied according to the type. In operation S152, T1PSC basic period is set to a neighboring period that is a multiple of the minimum basic period in the type 1 PSC, whereas the T2PSC basic period is set to a neighboring period that is constant to the minimum basic period in the type 2 PSC. In operation S154, listening periods are reset so that listening periods in the T1PSCn basic period and T2PSCk basic period overlap. Based on information about the settings, a request for a sleep mode is made, a response thereto is made, and an operation is carried out according to the sleep periods and the listening periods.

Exemplary embodiments of the present invention can minimize the power consumption of a terminal device. Since most of the power is consumed when the terminal device is in sleep mode, power consumption can be minimized by controlling listening periods by having unnecessary listening periods overlap with other power-saving mode listening windows.

The exemplary embodiments of the present invention have been explained with reference to the accompanying drawings, but it will be apparent to those skilled in the art that various modifications and changes may be made thereto without departing from the scope and spirit of the invention. Therefore, it should be understood that the above exemplary embodiments are not restrictive but illustrative in all aspects.

What is claimed is:

1. A method of controlling listening periods in a wireless telecommunications device, the method comprising:
    setting a first power-saving mode and a second power-saving mode, each of the first and second power-saving modes having a power-saving mode period in which power is saved and data is not transmitted and received, and a standby mode period in which data is transmitted and received;
    detecting the standby mode periods of the first and second power-saving modes;
    adjusting a starting period of one of the first and second power-saving modes so that the detected standby mode periods of the first and second power-saving modes overlap in time; and
    controlling power according to the adjusted one of the first and second power-saving modes and the other one of the first and second power saving modes,
    wherein the first power-saving mode is classified as a first type in which a sum of the power-saving mode period and the standby mode period is multiplied by a number raised to an exponent, and the second power-saving mode is classified as a second type in which a sum of the power-saving mode period and the standby mode period is fixed.

2. The method of claim 1, wherein the wireless telecommunication device is compliant with the IEEE 802.16 standard.

3. The method of claim 1, wherein the start periods of the first and second power-saving modes contain information about a frame where the power-saving mode period begins.

4. The method of claim 1, wherein a length of the starting period of the first power-saving mode is a sum of a length of a first power-saving mode period in which the first power-saving mode begins and a length of a first standby mode period that follows the first power-saving mode period.

5. The method of claim 1, further comprising overlapping a first mode starting period in the first power-saving mode with a second mode starting period in the second power-saving mode if a difference between a length of the first mode starting period and a length of the second mode starting period is smaller than a predetermined value.

6. The method of claim 1, further comprising setting a first mode starting period in the first power-saving mode to a neighboring period that is a multiple of a second mode starting period in the second power-saving mode if a difference between a length of the first mode starting period and a length of the second mode starting period is greater than a predetermined value, and the first mode starting period is longer than the second mode starting period.

7. The method of claim 1, further comprising setting a second mode starting period in the second power-saving mode to a neighboring period that is $2^n$ multiplied by a first mode starting period in the first power-saving mode if a difference between a length of the first mode starting period of and a length of the second mode starting period of is greater than a predetermined value, and the first mode starting period is shorter than the second mode starting period.

8. The method of claim 7, further comprising setting the first and second mode starting periods so that the second mode starting period precedes the first mode starting period.

9. A wireless telecommunications device having at first and second power-saving modes, each of the first and second power-saving modes comprising a power-saving mode period in which power consumption is reduced and data is not transmitted and received, and a standby mode period in which data is transmitted and received, the device comprising:
    a power-saving mode interval scheduler that controls intervals between the first and second power-saving modes;
    a power-saving mode message transmitting and receiving controller that transmits and receives messages with respect to the first and second power-saving modes;
    a parameter controller that sets the first and second power-saving modes, detects the standby mode periods from the first and second power-saving modes, and adjusts a starting period of one of the first and second power-saving modes so that the detected standby mode periods in the first power-saving mode and the second power-saving mode overlap in time; and
    a power-saving mode hardware controller that controls power consumption according to the adjusted one of the first and second power-saving modes and the other one of the first and second power-saving modes,
    wherein the first power-saving mode is classified as first type in which a sum of the power-saving mode period and the standby mode period is multiplied by a number raised to an exponent, and the second power-saving mode is classified as a second type in which a sum of the power-saving mode period and the standby mode period is fixed.

10. The device of claim 9, wherein the wireless telecommunications device is compliant with the IEEE 802.16e standard.

11. The device of claim 9, wherein the start periods of the power-saving mode contain information about a frame where the power-saving mode period begins.

12. The device of claim 9, wherein a length of the starting period of the first power-saving mode is a sum of a length of a first power-saving mode period in which the first power-saving mode begins, and a length of a first standby mode period that follows the first power-saving mode period.

13. The device of claim 9, wherein the parameter controller makes an adjustment so that a first mode starting period in the first power-saving mode coincides with a second mode starting period in the second power-saving mode if a difference between a length of the first mode starting period and a length of the second mode starting period is smaller than a predetermined value.

14. The device of claim 9, wherein the parameter controller sets a first mode starting period in the first power-saving mode to a neighboring period that is a multiple of a second mode starting period in the second power-saving mode if a difference between a length of the first mode starting period and a length of the second mode starting period is greater than a predetermined value, and the length of the first mode starting period is greater than the length of the second mode starting period.

15. The device of claim 9, wherein the parameter controller sets a second mode starting period in the second power-saving mode to a neighboring period that is $2^n$ multiplied by a first mode starting period in the first power-saving mode if a difference between a length of the first mode starting period and a length of the second mode starting period is greater than a predetermined value, and the first mode starting period is shorter than the second mode starting period.

16. The device of claim 15, wherein the parameter controller sets the first mode starting period and the second mode starting period so that the second mode starting period precedes the first mode starting period.

* * * * *